United States Patent
Amesoeder

(10) Patent No.: US 8,262,759 B2
(45) Date of Patent: Sep. 11, 2012

(54) FILTER DEVICE, PARTICULARLY FOR FILTERING GASEOUS FLUIDS

(75) Inventor: Dieter Amesoeder, Bietigheim-Bissingen (DE)

(73) Assignee: Mann + Hummel GmbH, Ludwigsburg (DE)

(*) Notice: Subject to any disclaimer, the term of this patent is extended or adjusted under 35 U.S.C. 154(b) by 83 days.

(21) Appl. No.: 12/836,942

(22) Filed: Jul. 15, 2010

(65) Prior Publication Data
US 2010/0275558 A1    Nov. 4, 2010

Related U.S. Application Data

(63) Continuation of application No. PCT/EP2008/067043, filed on Dec. 8, 2008.

(30) Foreign Application Priority Data

Jan. 24, 2008  (DE) .................. 20 2008 001 072 U

(51) Int. Cl.
*B01D 46/00*  (2006.01)
(52) U.S. Cl. ............. 55/309; 55/323; 55/385.3; 55/488; 55/498
(58) Field of Classification Search ............. 55/309, 55/323, 385.3, 488, 498; 123/198 E
See application file for complete search history.

(56) References Cited

U.S. PATENT DOCUMENTS

| 5,368,621 A | 11/1994 | Pool |
| 2009/0139915 A1* | 6/2009 | Tondreau et al. ............... 210/86 |

FOREIGN PATENT DOCUMENTS

| DE | 1957956 | 3/1967 |
| DE | GB2076690 | 12/1981 |
| DE | 29923422 | 9/2009 |
| FR | 891272 | 2/1943 |
| GB | 2135899 | 9/1984 |

OTHER PUBLICATIONS

PCT search report; German search report.

* cited by examiner

*Primary Examiner* — Jason M Greene
*Assistant Examiner* — Karla Hawkins
(74) *Attorney, Agent, or Firm* — James Hasselbeck

(57) ABSTRACT

A filter device for filtration of gaseous fluids has a filter housing provided with a receptacle. A first filter element and a second filter element are arranged in the receptacle of the filter housing behind one another in an axial direction of the filter housing. A first bypass that bypasses the first filter element is provided. An inflow side of the second filter element is arranged axially behind the first filter element and is fluidically connected to the first bypass. Fluid to be filtered passes in a flow direction of the fluid through the first bypass to the inflow side of the second filter element.

16 Claims, 2 Drawing Sheets

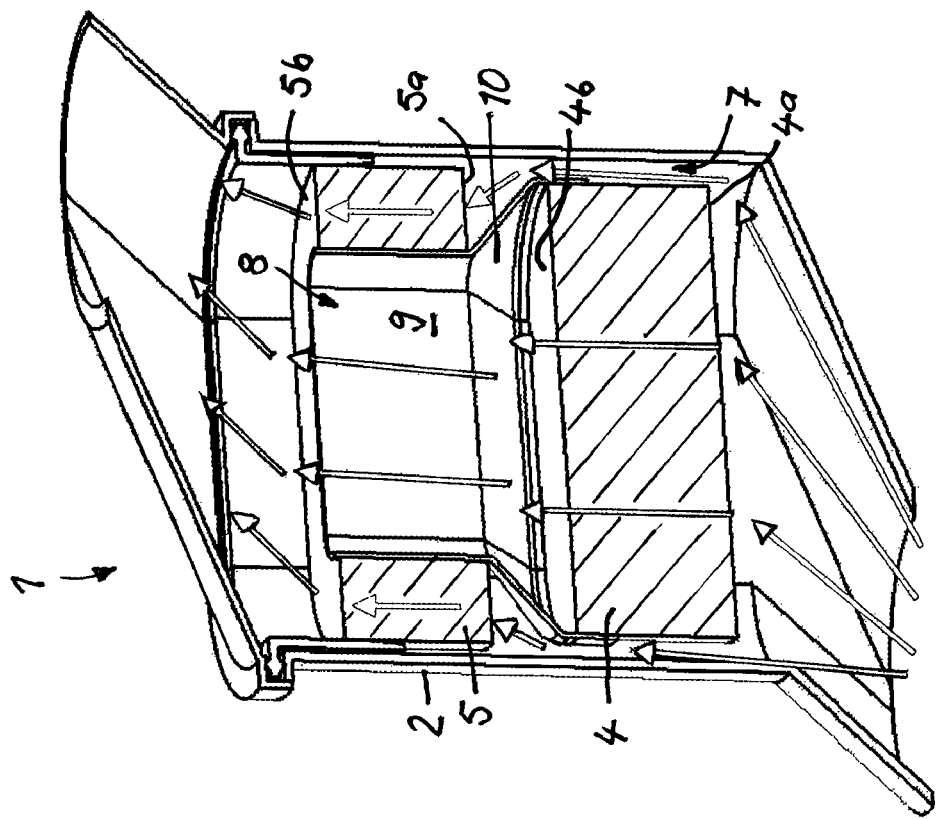
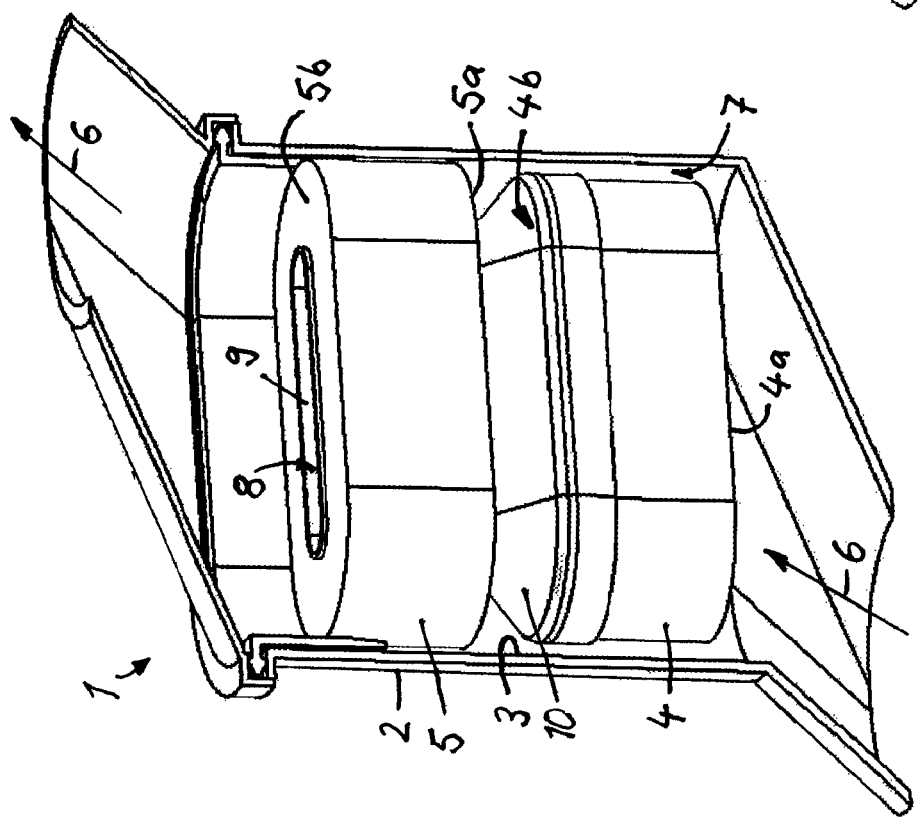

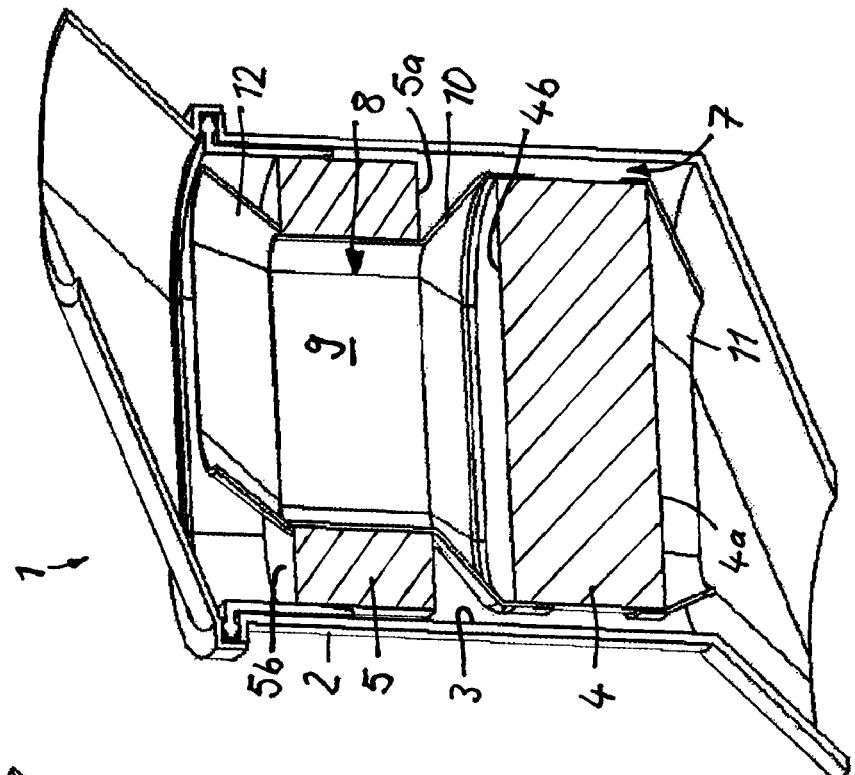
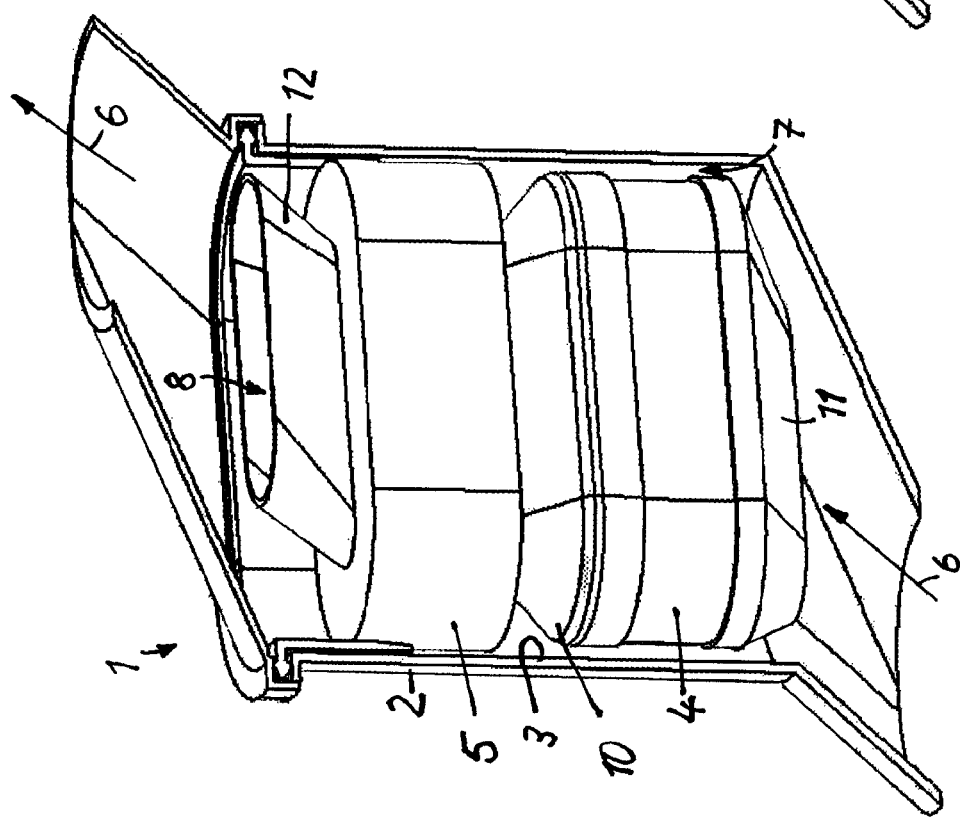

FILTER DEVICE, PARTICULARLY FOR FILTERING GASEOUS FLUIDS

CROSS REFERENCE TO RELATED APPLICATIONS

This application is a continuation application of international application No. PCT/EP2008/067043 having an international filing date of 8 Dec. 2008 and designating the United States, the International Application claiming a priority date of 24 Jan. 2008, based on prior filed German patent application No. 20 2008 001 072.1, the entire contents of the aforesaid international application and the aforesaid German patent application being incorporated herein by reference.

TECHNICAL FIELD

The invention relates to an air filter device particularly for filtration of gaseous fluids, comprising a filter element arranged in a filter housing.

BACKGROUND OF THE INVENTION

The invention concerns a filter device particularly for filtration of gaseous fluids, comprising a filter element arranged in a filter housing.

Air filters for internal combustion engines are known that are integrated in the intake manifold and have a filter element arranged in a filter housing. The filter element is flowed through by the supplied combustion air. Such an air filter is disclosed in EP 1 364 695 A1, for example. The air filter comprises a filter cartridge that is insertable into the filter housing and is axially flowed through by the combustion air. The purified combustion air is subsequently supplied to the cylinders of the internal combustion engine.

In case of such air filters, care must be taken that a sufficiently great mass air flow passing through the filter element is provided in order to ensure the required air supply to the internal combustion engine. This requires that the pressure drop across the filter element may not surpass a certain limit. At the same time, a satisfactory filtration of the internal combustion air must be ensured.

SUMMARY OF THE INVENTION

An object It is therefore an object of the present invention to provide with simple constructive measures a filter device that is distinguished by a high filtration capacity and relatively minimal pressure drop.

In accordance with the present invention, this is achieved in that in the filter housing two separately embodied filter elements are arranged that are positioned axially behind one another wherein the inflow side of the second filter element positioned downstream in the axial direction is supplied with fluid to be filtered through a bypass that is provided for bypassing the first filter element arranged upstream in the axial direction.

The filter device according to the invention is suitable in particular for filtration of gaseous fluids, for example, as an air filter for internal combustion engines, wherein optionally also a use as an air filter for the passenger compartment is conceivable. In principle, it is however also possible to use the filter device for other gases or optionally also liquid media.

The filter device has in the filter housing a receptacle in which two separately embodied filter elements are arranged that are positioned behind one another. The first filter element that is upstream in the flow direction has a bypass for bypassing the first filter element in such a way that the inflow side of the second filter element communicates with the bypass.

This embodiment provides a combination of parallel connection and serial connection of the two filter elements. Constructively, the filter elements as a result of their arrangement behind one another in the receptacle of the filter housing are connected in series. Fluidically however, a parallel connection is provided because each filter element is supplied, relative to the entire mass flow to be purified with a partial mass flow of the fluid to be purified. Branching at the inflow side of each individual filter element is realized by means of the bypass correlated with the first filter element positioned in front or upstream. For this purpose, the entire mass flow that is being supplied to the filter housing is distributed partially onto the inflow side of the first filter element and partially, by means of the bypass with circumvention of the first filter element, directly to the inflow side of the second filter element. Thus, a distribution of the supplied mass flow that is not yet filtered onto the inflow sides of two filter elements is realized.

This embodiment has the advantage that the total filter surface area relative to the flow cross-section of the receptacle in the filter housing can be enlarged. The sum of cross-sectional surface areas of the two filter elements is greater than the cross-sectional surface area of the receptacle in the filter housing. For example, the sum of the cross-sectional surface areas can be 1.5 times the cross-sectional surface area of the receptacle. As a whole, the mass flow to be filtered is distributed onto a larger filter surface area so that a desired filtration performance can be realized at reduced pressure drop per filter element in comparison to a prior art device with a single filter element.

In order to prevent that the purified medium of the first filter element is also supplied to the second filter element, expediently the outflow side of the first filter element is connected to a bypass that serves for circumventing the second filter element. This advantageous embodiment ensures that the fluid already purified in the first filter element is not filtered once again in the downstream second filter element. In this way, it is in particular possible to size the filtration capacity of the two filter elements such that they are substantially identical, for example, in that according to an advantageous embodiment the filtration surface area of the filter elements is at least approximately identical.

In the embodiment with a bypass for each filter element, the bypass of the first upstream filter element can be formed in that the first filter element has a smaller cross-sectional surface area than the receptacle in this section so that between the external side of the filter element and the internal side of the receptacle a passage for the fluid is provided that acts as a bypass. By means of this bypass, the supplied unfiltered fluid bypasses the first filter element and impinges on the inflow side of the second downstream filter element.

The bypass of the second filter element in contrast to this is advantageously formed by a separate flow passage that is integrated into the filter material of the second filter element. This integrated bypass connects expediently the entire outflow or clean side of the first upstream filter element with the outflow side of the receptacle so that the second filter element is completely bypassed by the purified fluid of the first filter element.

The combination of bypass at the external side of the first filter element and bypass through the center of the second filter element has the advantage of a simple geometry so that a uniform inflow at the respective inflow side of the filter elements is ensured. The mass flow that is supplied to the receptacle is automatically distributed onto the two inflow sides of the two filter elements. In order to divide the mass flow into substantially identical partial mass flows for each filter element, upstream of the inflow side of the upstream first filter element an air deflector can be arranged that divides the supplied mass flow of the fluid to be filtered into substantially identical partial mass flows. Basically, it is however sufficient to ensure by means of appropriate sizing of the cross-sectional surface areas of the inflow side of the first filter element and of the bypass bypassing the first filter element an appropriate division of the partial mass flows.

The two filter elements have advantageously substantially the same filtration capacity as well as the same pressure drop. This is achieved in an especially simple way in that the filter elements have the same configuration, for example, they are each embodied as a wound filter or as a flat filter or folded filter. Moreover, the same filtration capacity can also be achieved by an at least approximately same filter surface area in each filter element which is achieved for identical cross-section of the receptacle by a corresponding identical ratio of filter surface area relative to the bypass cross-sectional surface area in the two filter elements.

Basically, it is however also possible to not provide the receptacle for receiving the two filter elements with a constant cross-section but with a changing cross-section, for example, in such a way that the first filter element is arranged in a section of the receptacle with greater cross-section in order to ensure a satisfactorily large bypass cross-section relative to the first filter element. In the area of the downstream second filter element the receptacle then has a smaller cross-section. The second filter element fills the cross-section of the receptacle completely so that the external side of the filter element rests immediately against the inner side of the receptacle. The bypass for the second filter element extends approximately through the center of this filter element.

Further advantages and expedient embodiments are disclosed in the dependent claims, the description and the drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 1 depicts a filter device that is preferably provided for filtration of gaseous fluids, comprising a filter housing that has a receptacle for receiving two filter elements arranged axially behind one another wherein each filter element has correlated therewith a bypass, consistent with the present invention;

FIG. 2 shows the filter device of FIG. 1 in a section illustration;

FIG. 3 shows a filter device that is of a configuration that is similar to that of the preceding embodiment but is provided with an additional air deflector in the area of the inflow side of the first filter element and the outflow side of the second filter element, consistent with the present invention; and FIG. 4 shows the filter device according to FIG. 3 in section.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to an air filter device. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The embodiment illustrated in FIGS. 1 and 2 is a filter device for the filtration of gaseous fluids, in particular an air filter that is arranged in the intake manifold of an internal combustion engine for filtration of combustion air. The filter device 1 comprises a filter housing 2 that comprises a receptacle 3 for receiving two filter elements 4 and 5 sequentially arranged in the axial direction. The flow direction of the entire mass flow of the fluid to be filtered that flows into the housing and passes through the filter elements in the receptacle is identified by reference numeral 6. In flow direction 6 (axial direction) two filter elements 4 and 5 are positioned behind one another within the receptacle 3 of the filter housing 2. As a result of the constructive placement of the two filter elements 4 and 5 this is a serial connection.

In regard to the fluidic conditions however, the two filter elements 4 and 5 are also flowed through by partial fluid flows in parallel. In order to realize this, between the outer wall of the first upstream filter element 4—the one in front—and the inner wall of the receptacle 3 a first bypass 7 is formed through which a partial mass flow of the fluid introduced into the receptacle 3 is guided immediately to the second filter element 5 arranged downstream in axial direction by bypassing the first filter element 4. In this way, the entire mass flow that is supplied in flow direction 6 can be divided into two partial mass flows and supplied to the two filter elements 4 and 5. The two filter elements 4 and 5 are expediently each embodied as wound filters and have in particular at least approximately the same filtration performance as well as the same pressure loss.

The first bypass 7 between the outer wall of the first filter element 4 and the inner wall of the receptacle 3 is formed in that the first filter element 4 has a smaller diameter than the receptacle 3 at this location so that the axial passage for the partial mass flow of the supplied combustion air is formed. The partial mass flows are supplied to the respective inflow or raw side 4a, 5a of each filter element 4, 5.

As can be seen in particular in the section illustration of FIG. 2, the first filter element 4 is of a massive configuration while the second filter element 5 arranged downstream has an integrated second bypass 8 that is provided centrally within the second filter element 5. This second bypass 8 comprises a flow passage 9 as a separate component within the second filter element 5 as well as a transfer passage 10 that is arranged at the outflow or clean side 4b of the first filter element 4 and connects it with the flow passage 9 extending through the second filter element 5. The flow passage 9 as well as the transfer passage 10 that together form the second bypass 8 can be embodied as a monolithic component. The second bypass 8 serves for circumventing the second filter element 5 so that the purified fluid that has passed the filter element 4 and flows out through the outflow side 4b of the first filter element 4 can be discharged from the receptacle 3 and the filter device 1 through bypass 8 by bypassing the second filter element 5. In this way, a flow situation can be realized such that on the one hand a partial mass flow of the supplied fluid to be filtered is supplied to the inflow side of each filter element, respectively, and, on the other hand, the exiting purified partial mass flows, after having passed each filter element, respectively, are discharged separately by bypassing the other filter element.

The filter housing 2 has a constant cross-section across the axial length of the receptacle 3 receiving the two filter elements 4 and 5. The second filter element 5 has an outer diameter that is matched to the inner diameter of the receptacle so that the outer wall of the second filter element 5 rests seal-tightly against the inner wall of the receptacle and at this location no passage of fluid is possible. Therefore, the bypass flow that has bypassed the first filter element 4 is impinging immediately on the inflow side 5a of the second filter element 5 and is forced to pass through the filter material of the second filter element 5. An immediate transfer into the second bypass 9 is prevented as a result of the closed configuration of the transfer passage 10 that connects in a fluid-tight way the outflow side 4b of the first filter element 4 with the flow passage 9 that is integrated into the material of the second filter element 5.

The two filter elements 4 and 5 have, like the receptacle 3, an oval cross-section. Basically, other cross-sectional shapes are also possible, in particular round cross-sectional shapes and optionally also angular cross-sectional shapes.

The embodiment illustrated in FIGS. 3 and 4 corresponds substantially to the first embodiment according to FIGS. 1 and 2 so that reference is being had to the description provided in this context. According to FIGS. 3 and 4 additional air deflectors 11 and 12 are provided in the receptacle of the filter housing 2 which affect the flow at the inflow side as well as the outflow side. A first air deflector 11 is located at the inflow side 4a of the first filter element 4. The first air deflector 11 has at its open side a smaller flow cross-section than the inflow side 4a of the filter element so that a smaller proportion of the entire supplied mass flow is supplied to the first filter element and a corresponding larger proportion passes through the bypass 7 and thus past the first filter element and is supplied to the second filter element 5. By means of the air deflector 11 the proportion of the respective air mass flow to be supplied to each filter element can be influenced.

A second air deflector 12 is located in the area of the outflow side 5b of the second filter element 5. This second air deflector 12 however does not affect the filtration in the second filter element 5 but forms a component of the second bypass 8 in which the second air deflector 12 adjoins the flow passage 9 that is embedded in the filter material of the second filter element 5. By means of the second air deflector 12 the outflow of the mass flow passing through the bypass 8 and constituting the purified fluid of the first filter element 4 can be affected. At the same time, it is also possible to affect the flow of the fluid that is passing through the second filter element 5 because the outer wall of the second air deflector 12 is also a boundary for the fluid exiting from the second filter element.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter device for filtration of gaseous fluids, comprising:
   a filter housing defining a receptacle therein and including
      an inlet; and
      an outlet, said receptacle in fluid flow communication with said inlet and said outlet;
   a first filter element and a second filter element arranged within said receptacle behind one another in an axial direction of said filter housing;
   a first bypass passage that bypasses fluid from said inlet around said first filter element to said second filter element;
   a second bypass passage that bypasses said second filter element;
   wherein an inflow side of said second filter element arranged axially behind said first filter element is fluidically connected to said first bypass,
   wherein an outflow side of said first filter element is fluidically connected to said second bypass,
   wherein fluid to be filtered passes in a flow direction through said first bypass to said inflow side of said second filter element,
   wherein said first filter element and said second filter element are arranged in a parallel flow connection with each filter element filtering a different mass flow portion of an entire mass flow of gaseous fluids entering said inlet, and
   wherein at least one of said bypass passages extends through an interior of one of said filter elements.

2. The filter device according to claim 1, wherein
   a sum of cross-sectional surface areas of said first and second filter elements is greater than a cross-sectional surface area of said receptacle.

3. The filter device according to claim 1, wherein a cross-sectional surface area of at least one of said first and second filter elements is smaller than a cross-sectional surface area of said receptacle, wherein one of said first and second bypasses is formed between an outer wall of said at least one of said first and second filter elements and an inner side of said receptacle.

4. The filter device according to claim 1, wherein one of said first and second bypasses is an integrated bypass that is integrated into a material of said first or second filter element.

5. The filter device according to claim 4, wherein said integrated bypass is a separate component forming a flow passage that is integrated into said first or second filter element.

6. The filter device according to claim 4, wherein said integrated bypass is integrated centrally in said first or second filter element.

7. The filter device according to claim 1, wherein said first bypass is arranged outside of a first filter surface of said first filter element and said second bypass is arranged within a filter surface of said second filter element.

8. The filter device according to claim 1, wherein at least one of said first and second filter elements is embodied as a wound filter.

9. The filter device according to claim 1, wherein at least one of said first and second filter elements is embodied as a flat filter or a folded filter.

10. The filter device according to claim 1, wherein said receptacle has a constant cross-section in said flow direction of the fluid.

11. The filter device according to claim 1, wherein said first and second filter elements have at least approximately the same filter surface area.

12. The filter device according to claim 1, comprising at least one air deflector having a first end arranged at an inflow side or outflow side of at least one of said first and second filter elements, for affecting a flow of the fluid, wherein said at least one air deflector has an opposing second end having an open side through which a portion of said entire mass flow of gaseous fluids flows into or out of said at least one air deflector, wherein said at least one air deflector is extends from said first end then outwardly away from and beyond both said first end second filter elements to said open side.

13. The filter device according to claim 12, comprising a first air deflector at an inflow side of said first filter element and a second air deflector at an outflow side of said second filter element.

14. The filter device according to claim 1, wherein an entire mass flow of the fluid to be filtered is introduced into said receptacle.

15. The filter device according to claim 1 as an air filter for internal combustion engines.

16. The filter device according to claim 12, wherein said open side at said second end of said at least one air deflector has a smaller flow cross-section than said first side, wherein said smaller cross-section is operable to proportion said mass air flow portions of said entire mass flow between said filter elements.

\* \* \* \* \*